United States Patent [19]

Turnbull et al.

[11] Patent Number: 5,787,115
[45] Date of Patent: Jul. 28, 1998

[54] KEY TELEPHONE SYSTEM WITHOUT COMMON CONTROL

[75] Inventors: Robert Turnbull; David Westergaard; Bruce W. Yee, all of Calgary; Michael J. Lucas, Airdrie; Alan D. Eyre; Brian McKinney, both of Calgary, all of Canada

[73] Assignee: Northern Telecom Limited, Montreal, Canada

[21] Appl. No.: 579,967

[22] Filed: Dec. 28, 1995

[51] Int. Cl.$^6$ .................. H04B 1/38; H04L 5/16
[52] U.S. Cl. ............... 375/222; 375/219; 370/278
[58] Field of Search ................... 375/222, 272, 375/303, 219; 329/303; 332/100; 370/278

[56] References Cited

U.S. PATENT DOCUMENTS

| | | | |
|---|---|---|---|
| 4,068,198 | 1/1978 | Otto | 332/19 |
| 4,488,120 | 12/1984 | Carsten | 329/122 |
| 4,538,136 | 8/1985 | Drabing | 340/310 |
| 4,567,603 | 1/1986 | Howell et al. | 375/65 |
| 4,633,425 | 12/1986 | Senderowicz | 364/825 |
| 4,670,888 | 6/1987 | Smith III | 375/62 |
| 4,691,342 | 9/1987 | Waldron et al. | 379/98 |
| 4,724,534 | 2/1988 | Guzman-Edery et al. | 375/62 |
| 4,766,599 | 8/1988 | Miyazaki | 375/8 |
| 4,825,448 | 4/1989 | Critchlow et al. | 375/8 |
| 5,014,285 | 5/1991 | Basile et al. | 375/62 |
| 5,054,034 | 10/1991 | Hughes-Hartoss | 375/8 |
| 5,124,698 | 6/1992 | Mustonea | 340/825.44 |
| 5,130,676 | 7/1992 | Mutz | 332/100 |
| 5,329,258 | 7/1994 | Matsuura | 332/100 |
| 5,416,779 | 5/1995 | Barnes et al. | 370/29 |
| 5,555,276 | 9/1996 | Koenck et al. | 375/303 |
| 5,648,993 | 7/1997 | Kawada | 375/357 |
| 5,657,344 | 8/1997 | Na | 375/219 |

Primary Examiner—Stephen Chin
Assistant Examiner—Mohammad Ghayour
Attorney, Agent, or Firm—Michael M. Sakovich

[57] ABSTRACT

A multi-line key telephone system not having a key service unit includes three analog telephone lines to which up to eight, three-line telephones may be connected to provide enhanced service features with cost-effectiveness. System reliability is maintained, notwithstanding the power dependency of the telephones, by including POTS telephones to provide uninterrupted essential telephone service in the event of a power outage. Both data and voice communications between two or more of the three-line telephones is achieved by converting an input digital bit stream from either a digital or analog source into a corresponding out-of-band binary FSK radio frequency output signal that is transceivingly communicated between the three-line telephones as data packets within a TDM frame. The out-of-band signal thus permits analog voice communications on the same line to proceed without interference. A telephone initiating a communications session acts as a master station, establishing inter-station communications synchronous at the frame level and asynchronous at the packet level. The called telephone functions as a slave station in a second time slot synchronized to a first time slot in the TDM frame received from the master. Temporary storage of data in firmware buffers and controlled timing at both the master and slave permits these stations to function within their respective TDM frame time slots.

16 Claims, 6 Drawing Sheets

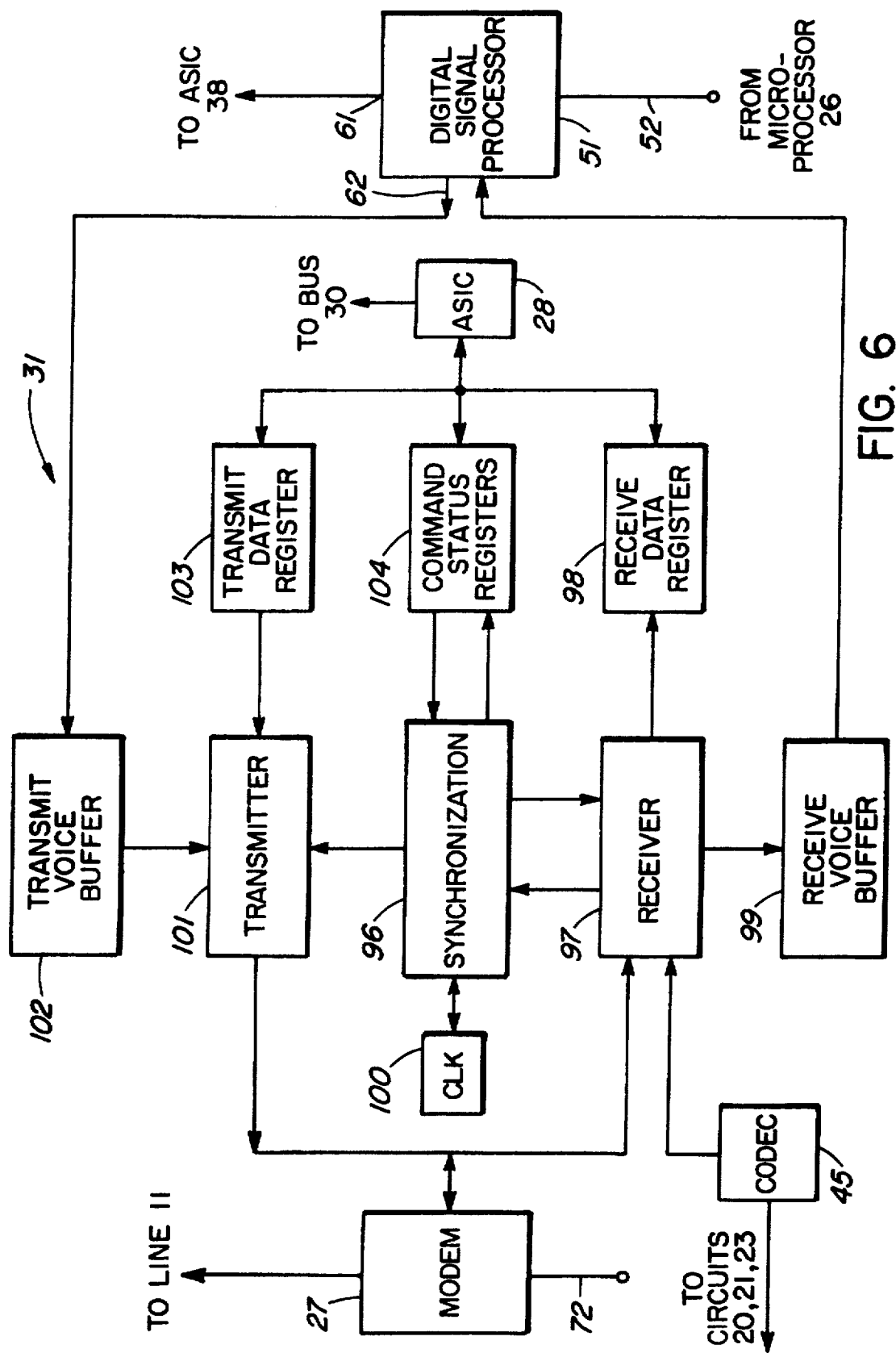

KEY TELEPHONE SYSTEM WITHOUT COMMON CONTROL

FIELD OF THE INVENTION

The present invention relates to a multi-line key telephone system and to its method of operation which includes shared intercom and normal call functions over a two-wire transmission path.

BACKGROUND OF THE INVENTION

Multiple line telephone services in a modest subscriber installation may simply include separate lines to which individual telephones and corresponding extensions are connected. A more sophisticated system with a greater number of telephone lines and corresponding telephone stations requires multi-line telephones known as "key phones". Each telephone in the system is connected by a cable to a central control box referred to as a "key service unit" (KSU).

A principal advantage of a key telephone system is that it obviates the need for a PBX system and attendant switchboard operators. A problem with the key telephone system, however, is the required cable to the KSU which, if large, complicates an installation and creates difficult service problems should breaks develop in one or more conductors of the cable. In an attempt to resolve this difficulty, current technology has advanced to smaller cables with an ultimate goal of conducting multiple telephone transactions over a single pair of wires without interference between stations.

Small businesses and particularly home offices are naturally inclined to seek an advantageous appearance of a large organization through their telephone system while avoiding major capital investments or service costs. Telephone systems not having a need for a KSU make this objective readily achievable by providing subscribers with accessible system-type features that significantly enhance customer service and business efficiency with cost-effectiveness. But reliability problems experienced with known KSU-less telephone systems occur when the telephones of the system are power-dependent. A power interruption will therefore shut down the system in whole or at least in part to lessen the overall benefits otherwise achieved.

Intercom calling is a prominent feature of KSU-less systems but may require a dedicated wire pair for communication. Multiplexing may also be used for intercom services but is often restricted to only one of the multiple lines interconnecting the telephones of the system. Since intercom conversations are carried on one line, usually the first line, all of the telephones will require, and be restricted to, the same first line for intercom communications. Although independent intercom groups may be set up by assigning different first lines to different telephones in the system, the problem then is to provide intercom access between groups.

SUMMARY OF THE INVENTION

Having regard to the aforedescribed problems relating to the operation of a KSU-less key telephone system, together with the recited problems associated with intercom implementation, one provision of the present invention is an apparatus and a method utilizing such apparatus that provides improved system performance and substantially eliminates the problems associated with intercom usage.

Another provision of the invention is a three-line analog telephone system which is a cost-effective alternative to more expensive key systems.

A further provision of the invention is the inclusion of analog telephone lines to which plain old telephone service (POTS) telephones may be connected to provide reliable and continuing telephone service in the event of a power failure.

Yet another provision of the invention is a telephone key system without a KSU that facilitates use and development of the system by providing a simple "unplug and play" feature which permits expansion by plugging in up to eight, three-line telephones. Alternatively, just plugging in an optional system feature adaptor (SFA) provides cost-effective, centralized delivery of system features such as music on hold and paging.

Still another provision of the invention is a KSU-less telephone key system having a wide range of advanced features including messaging, directed call transfer, call detail recording (CDR), call logs, redial lists and call timers for processing incoming and outgoing calls more efficiently.

The problems associated with the prior art may be substantially overcome and the foregoing provisions achieved by recourse to the invention which, in one aspect thereof, relates to apparatus for reversibly converting an input digital bit stream into a corresponding binary FSK radio frequency output signal. The apparatus comprises, in combination, a first phase-locked loop circuit including a voltage controlled oscillator having a control terminal, an output terminal and an input terminal to which a source of digital data is connected. Control means are connected to the control terminal for selectively enabling the first phase-locked loop circuit in response to predetermined control signals input to the control means from associated timing circuit means to generate an FSK signal at the output terminal corresponding to an input bit stream of digital data. Coupling means connect the modem to a transmission medium for bidirectional communication of binary FSK radio frequency signals and a second phase-locked loop circuit is configured as an FSK demodulator having an input terminal to which received FSK signals are coupled from the medium and an output terminal at which the demodulated signals comprise a corresponding bit stream of digital data.

Another aspect of the invention relates to a UART in a telephone station connected via a modem to a two-wire telephone line, the UART communicating with the modem, a microprocessor and a digital signal processor for effecting voice and data transfers and communicating time division multiplex protocol control to a like telephone station on the same line. The UART comprises in combination, synchronization means including adjustable master clock means for defining the respective positions of individual ones of a plurality of voice and data packets within a TDM frame having a predetermined data bit structure. Receiver means are connected to the modem for acquiring a first valid packet header and start bit and issuing a sync pulse to the synchronization means to adjust the master clock means to conform to the timing of a new communications session. A receive data register is coupled to a first output of the receiver means for temporarily storing data packets indexed to a first position within a frame by the synchronization means and a receive voice buffer is connected between a second output of the receiver means and the input of a digital signal processor for accumulating and temporarily storing voice packets indexed to a second position within the TDM frame by the synchronization means.

Still another aspect of the invention relates to a method for selectively effecting data and voice packet transfers and communicating time division multiplex protocol control between at least two telephone stations connected across a two-wire telephone line. The method comprises the steps of, establishing one station as a communications session master by seizing the line preparatory to calling one of the other stations, transmitting an out-of-band data signal including a data packet having a valid header and start bit from the master station to acquire inter-station synchronization at a TDM frame level with a called slave station, generating a synchronizing pulse in response to receiving the valid header and start bit at a receiver of the slave station and adjusting a master time clock in the slave station to conform to the timing of the master station by defining the respective positions of subsequently received voice and data packets within a received TDM frame having a predetermined data bit structure.

A further aspect of the invention relates to a method for establishing full-duplex intercom communications with signaling between at least two telephone stations connected across a two-wire transmission line carrying an analog voiceband call. The method comprises the steps of, transmitting an out-of-band data signal from a calling station during a first time slot of a TDM frame to establish master station priority preparatory to initiating an intercom session, signaling a called station to establish its status as a slave station assigned to a second time slot of the TDM frame synchronized to the first time slot of the master station to effect inter-station frame synchronization, generating and buffering digitized voice data at the stations in each direction for transmit and receive to accommodate inter-station communication synchronous at the frame level and asynchronous at the packet level, enabling a data transmit mode in the slave station to seize the line, packetize the digitized voice data and transmit an out-of-band data packet to the master station during the second time slot of the TDM frame in response to the master station call and receiving the data packet at the master station during the first time slot of the TDM frame.

BRIEF DESCRIPTION OF THE DRAWINGS

The invention will now be more particularly described with reference to embodiments thereof shown, by way of example, in the accompanying drawings in which:

FIG. 6 is a block diagram of a UART used in each telephone station in the system of FIG. 1.

DETAILED DESCRIPTION OF THE PREFERRED EMBODIMENTS

The embodiments of the invention hereinbelow disclosed rely on block diagrams to describe certain apparatus and various circuit elements together with their respective functions. Similarly, software control functions are described in detail in program listings which have been included to disclose the precise manner of digital computer programming and to provide all necessary control and timing for full-duplex intercom above the voiceband in a two-wire KSU-less key telephone system using a FSK modem.

The aforenoted diagrams and the program listings represent certain hardware and software features that would be known to those skilled in the art to whom this specification is addressed, although not in the novel combinations disclosed. Accordingly, the following constitutes a sufficient and adequate description to such individuals for a comprehensive understanding of the best mode to give effect to the embodiments as disclosed and claimed herein.

Figure 1:
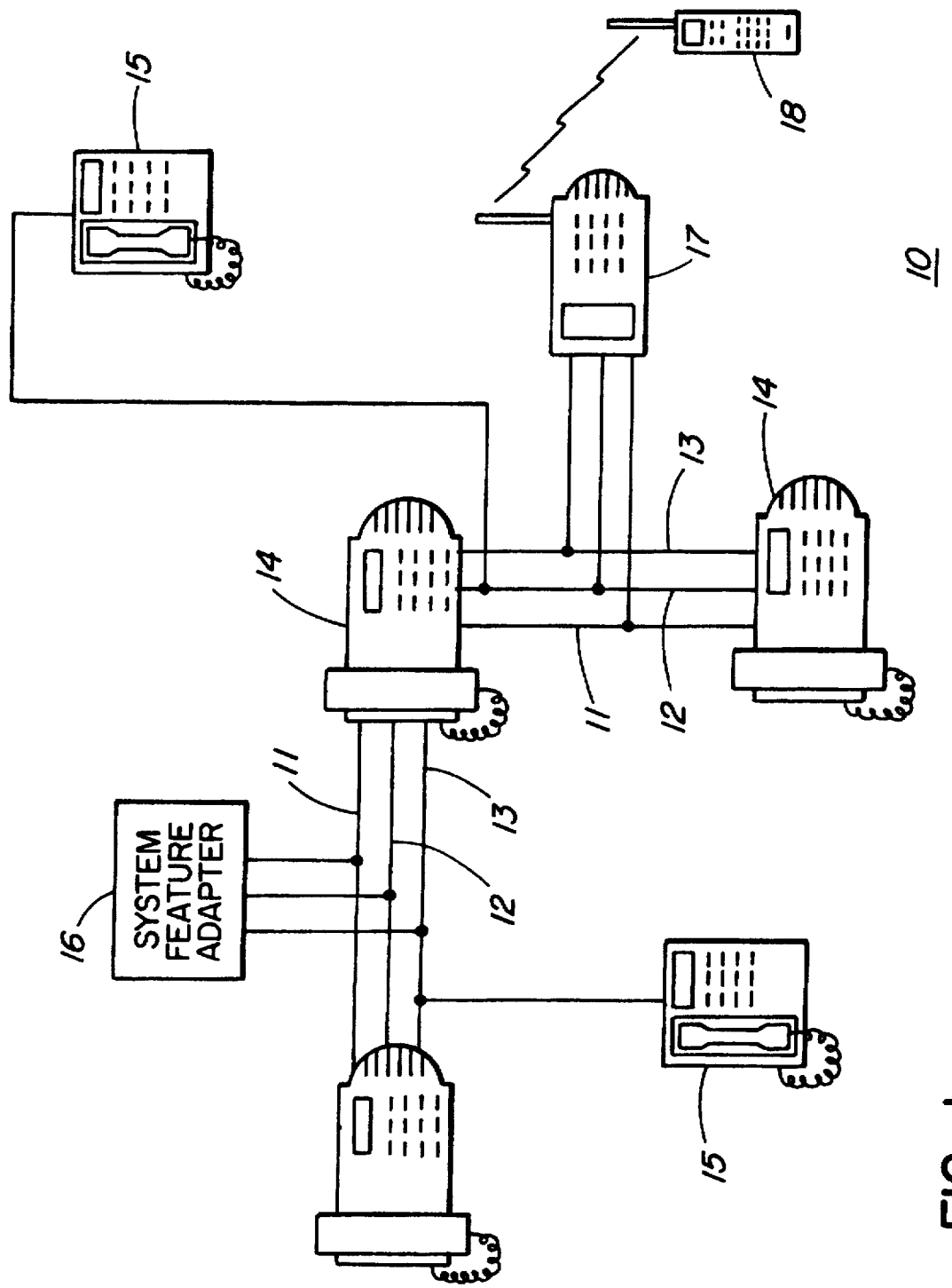
FIG. 1 is a diagram of a key telephone system without a KSU in accordance with the invention.

A KSU-less key telephone system 10 is diagrammatically represented in FIG. 1 which includes three telephone lines 11, 12, 13 to which are connected three, three-line telephone stations 14 that include intercom with signaling. It will be understood that the telephone lines are of the analog type and, as shown, communicate with the stations 14.

The stations 14 provide a wide range of advanced system features which include messaging and directed call transfers that are desirable since features of this type provide small businesses with a more business-like appearance. Call management capabilities are also included in the stations 14 and include call detail recording (CDR), call logs, redial lists and call timers, all of which enhance the more business-like appearance of the system 10.

Typical of multifeatured telephones, a separate source of operating power is required and may be provided either from an internal battery or, from an external power source comprising a power supply adaptor, not shown, that is known in the art and which is normally plugged into an AC power outlet at a subscriber's location. In the event of a power failure, the system 10 continues to function via single-line POTS telephone sets 15 of which two are shown connected to lines 12 and 13. Since the sets 15 do not require a power source for operation, system reliability is maintained should a power outage occur.

Forming part of the system 10, a system feature adapter (SFA) 16 provides cost-effective centralized delivery of system features, such as music on hold and paging. Although not illustrated, it will be understood that a telephone answering device may also be connected to the system in view of the analog connections which are available for POTS telephones, fax lines, modems and three-line cordless telephones. The latter is illustrated in FIG. 1 as comprising a base station 17 connected to the lines 11-13, and which communicates with its handset 18 via a radio link.

Figure 2:
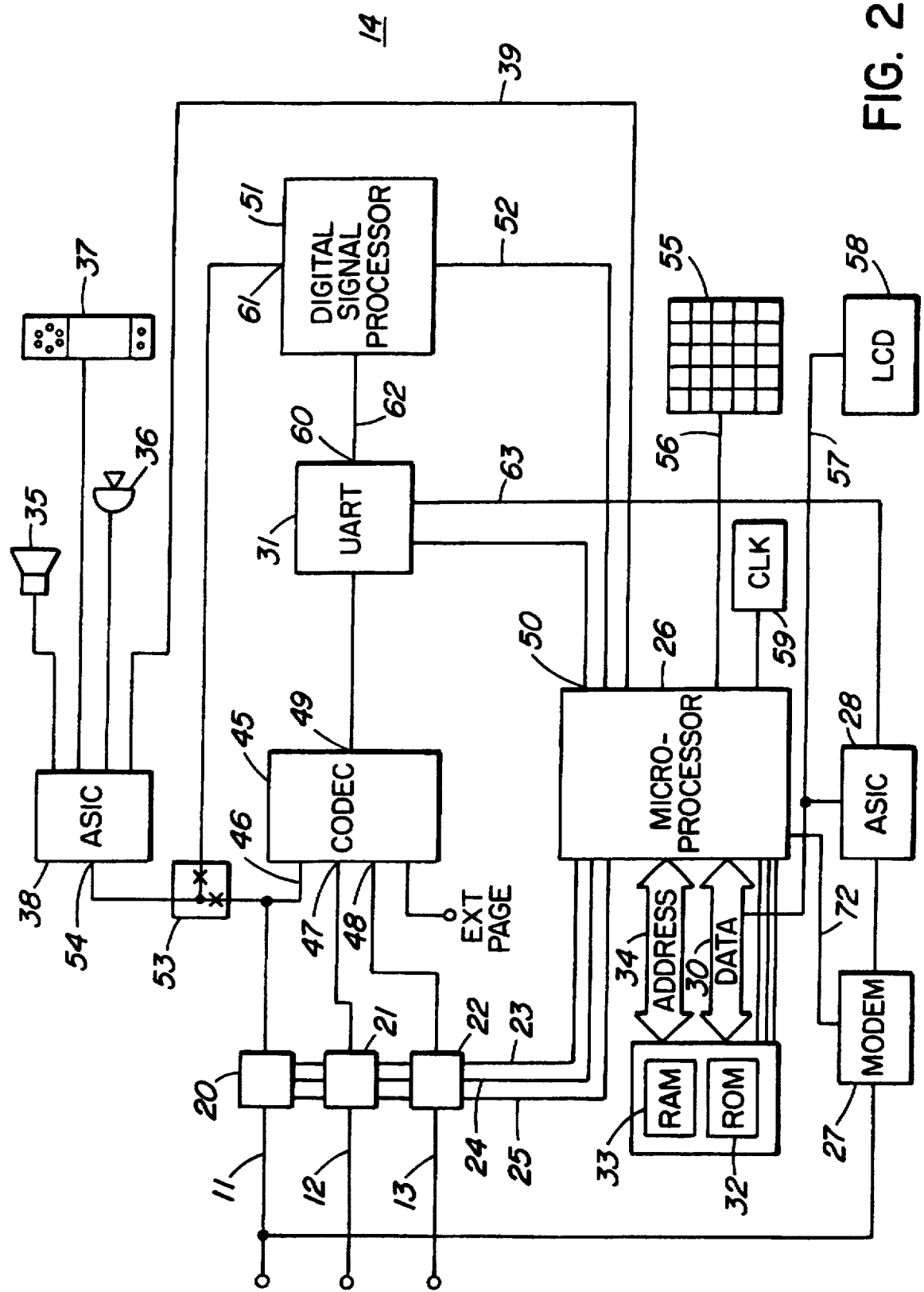
FIG. 2 is a block diagram of a three-line telephone station with intercom that is used in the system of FIG. 1.

A detailed block diagram of a station 14 is illustrated in FIG. 2 wherein it will be observed that the station is connected to the lines 11-13 through coupling circuits 20, 21 and 22. It will also be noted that the circuits 20-22 are interconnected by three 3-conductor cables 23, 24, 25 which terminate at three corresponding input ports of a microprocessor 26 that sense the status of any station 14 hookswitch, as well as the presence of tip/ring voltage and ringing signals.

Out-of-band signals input to the station 14 are taken from the line 11 which is connected to a first I/O port of an out-of-band modem 27. A second I/O port of the modem 27 is coupled to an I/O port of an application specific integrated chip (ASIC) 28 which functions to separate the modem output into digital signaling data and digitized voice signals. A digital signaling data output from the ASIC 28 is shown connected to a data bus 30 whereas an incoming call digitized voice signal is connected to an I/O port of a second ASIC that is configured as a universal asynchronous receiver transmitter (UART) 31.

Operating codes for the microprocessor 26 are stored in ROM memory 32 whereas a RAM memory 33 provides the necessary flash code and data store, and various lists which include a directory list as well as a callers list. Stored data is communicated to the microprocessor 26 over the bus 30 while address data is communicated along an address bus 34.

The station 14 is adapted to provide a handsfree mode of operation and therefore includes a handsfree speaker 35, a handsfree microphone 36 and a handset 37, each of which are connected to a third ASIC 38 which includes a dual-tone multifrequency (DTMF) generator and secondary loss control means, as well as a speaker power amplifier and a microphone preamplifier. Control of the ASIC 38 is performed by the microprocessor 26 with control signals being coupled therefrom to the ASIC along a serial control bus 39.

A codec 45 is illustrated with three I/O ports 46, 47 and 48 that are connected to corresponding coupling circuits 20, 21 and 22, respectively. An output 49 of the codec is connected to the UART 31 where it is subjected to path control in response to control signals from an output 50 of the microprocessor 26. An I/O port 60 of the UART 31 communicates with a digital signal processor (DSP) 51 which is controlled by the microprocessor 26 over a command serial interface 52 output signals from an I/O port 61 of the DSP 51 are selectively connected by a switch 53 to an I/O port 54 of the ASIC 38 and therefrom to the speaker 35, microphone 36 or handset 37 as the case may be. It will be understood that the switch 53 also functions to connect the I/O port 54 to the coupling circuit 20 as illustrated.

Data from a key matrix 55 may be keyed into the microprocessor 26 over a bus 56. Conversely, an external data bus 57 couples data from the bus 30 to a liquid crystal display (LCD) 58.

Timing for the various functions required in the operation of the station 14 under control of the microprocessor 26 is performed by a clock 59 of the latter.

Figure 3:
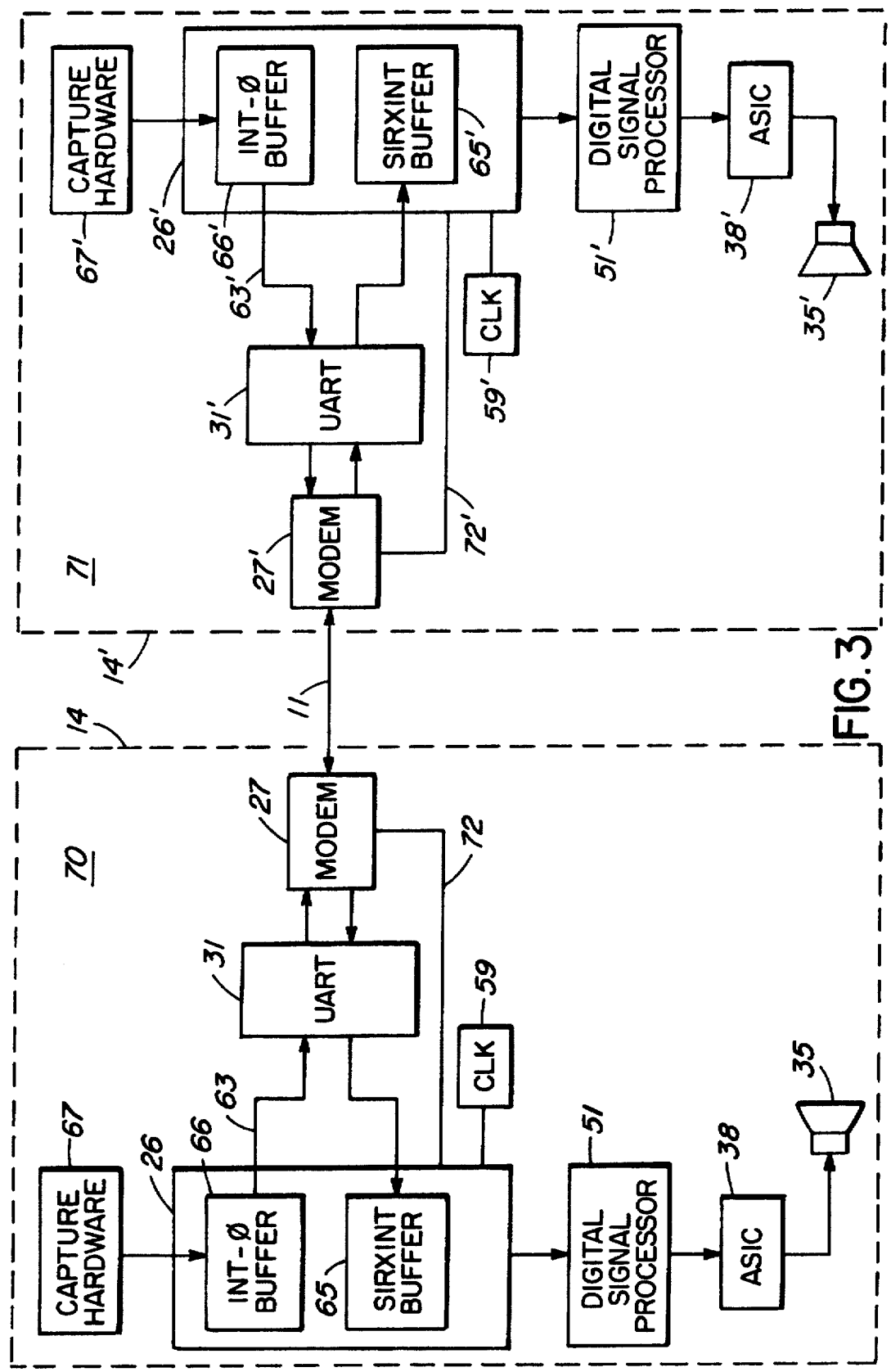
FIG. 3 is a block diagram illustrating a voice data flow path between two telephone stations in the system of FIG. 1.

FIG. 3 illustrates a voice data flow path showing firmware buffers 65 and 66 that form part of the microprocessor 26. The flow path is between two stations 14, and since each station 14 is identical in circuit structure, it will be understood that the description presented hereinbelow applies equally to both stations. Moreover, having regard to FIG. 2 and its corresponding description, signal capture hardware need not be further described and is therefore conveniently represented in FIG. 3 as a block 67. To facilitate understanding, the numerical designations of the second station are shown with primes.

One feature of the system 10 is a full-duplex intercom mode with signaling capability using time division multiplexing (TDM), a custom high-speed frequency shift keying (FSK) modem and custom control firmware, the source code of which will be subsequently described in greater detail. The aforenoted system elements function in combination to provide four high quality voice channels in a TDM frame, together with one medium-speed data/signaling channel above the voiceband on a common two-wire twisted pair telephone line. The high quality intercom results from a high data transfer rate, four channels at 64 Kbps/channel, which is possible when using a carrier frequency of approximately 6 MHz. Further quality improvements are achieved by the signaling channel having its own time slot in the TDM frame. Signaling is therefore out-of-band and does not interfere with voice intercom. The result is a very clear and natural sounding intercom session. An additional benefit of the TDM method, as will be described in greater detail below, is that an 8 Kbps, or better, data transfer can occur at the same time and between the same two stations 14 while an intercom call is in session.

The firmware 65 and 66 illustrated in the data flow path diagram of FIG. 3, uses five interrupts and other support code to provide a two-channel TDM intercom over a two-wire analog telephone line. This communication occurs above voiceband by modulating the output of the FSK modem 27 using a digital signal to represent either data or voice. The firmware 65 and 66, which corresponds to the source code disclosed in an APPENDIX hereto provides necessary timing and decision making to properly control the modems 27, 27'.

The firmware 65, 66 uses the concept of a master and a slave. A master code is responsible for starting an intercom session and for recovering from transmission failure, such as a telephone being unplugged, while the slave code is responsible for responding to the master's transmission.

Initially, one of the stations 14 initiates an intercom session by going offhook and seizing one of the lines 11, 12, 13. Following the resolution of collision, such as by token passing, access to a line is determined in favor of the station having the token. Thus, only one station, the one with the token, is given the opportunity to seize the line.

Any one of the stations 14 in the system 10 may be either a master or slave station depending upon which station seizes the line. Thereafter, analog voice signals output from the microphone 36 or the handset 37 are captured in the hardware 67 and digitized at the rate of one byte every 125 microseconds or 64 Kbps, followed by buffering in the firmware 66. FIG. 3 shows a master 70 and a slave 71, both of which begin such buffering on start-up of the session. When the master 70 has buffered eight bytes of voice data, which is performed in the routine "INT_0", it attempts to send its data out of the serial port 63 as a burst of voice data. While the slave 71 also buffers voice data, it listens for a transmission from the master 70 and does not respond until this transmission has been successfully received.

Before the master 70 can send its voice data, it checks to see if it has received an eight byte packet from the slave 71. On startup, the master support code indicates that this packet has been received. However, in the event that the master 70 has not received this packet, it withholds sending its current packet and artificially indicates that the packet from the slave 71 was received. The master 70 then sends an eight byte packet in the next TDM frame. This procedure, called "recovery", is necessary because of the manner in which FSK modems function.

In order to modulate and transmit the voice data, a control line 72 of the modem 27 must be driven low, and a settling time of at least 10 microseconds must be allowed before data is applied to the input of the modem. Therefore, the firmware seizes the line, thereby driving the modem control line low in the routine "S1RXINT" just after this routine has received and buffered eight bytes of data sent from the transmitting station. Seizing the line at this point provides more than adequate time for the modem 27 to settle or start-up. Without the recovery mode, a missed packet from either the master or slave would result in failed communications as neither would seize the line.

When neither the master 70 nor slave 71 is transmitting data, the line is noisy and it is possible that a valid start bit could occur erroneously, causing the respective stations of the master and slave to respond at the wrong time. To avoid this possibility, the firmware allows the stations to monitor the line only at predetermined times. In the case of the master 70, it monitors the line approximately 68.25 microseconds after it has dispatched the last byte of an eight byte voice data packet. A timer in the microprocessor 26 is set in the routine "TXINT". It is assumed that the slave 71 will have received the master's transmitted packet and seized the line, thereby providing a clean line for listening. In the case of the slave 71, it begins monitoring the line approximately 75 microseconds after it has sent its voice data packet. The assumption again is that the master 70 will have seized the line by this time, thus acquiring a clean line having a low noise level.

The modem 27 is turned off in the "TXINT" routine in both the master 70 and the slave 71 by driving its control line 72 high after the last bit of a data stream has been shifted out. However, in the master 70, the modem 27 turnoff is delayed by 25 microseconds to maintain the integrity of the line while the slave 71 processes the last byte sent.

Required timing is performed by two timers forming part of the microprocessor 26. These timers are referred to as timers X and Y and are interrupt driven. Interrupt service routines for these timers provide the necessary actions of enabling the serial interrupt, for listening to the line, and, in the case of the master 70, for turning off the modem 27. These routines are labelled "TIMERXINT" and "TIMERYINT" in the source code.

The code for the master 70 and the slave 71 is slightly different as the timing is different for both sides. The code is provided as an attachment with the master code labelled as "Master" and the slave code labelled as "Slave".

As described, two voice channels are required to provide two-way intercom. An additional voice channel is required to provide non-blocking intercom when either music on hold is in use or page is occurring, or a simplex conversation (i.e., door phone) is in progress. When four voice channels are provided, then two simultaneous intercom calls can occur in the system 10.

Figure 4A:
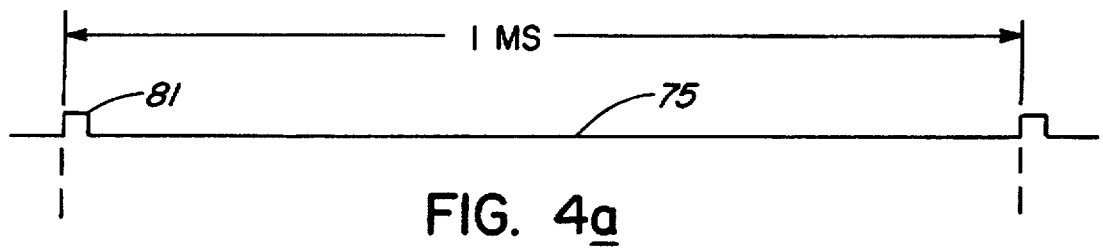
FIGS. 4a and 4b illustrate a typical transmission frame for a full-duplex, time division multiplexed intercom call in accordance with the invention.
Figure 4B:
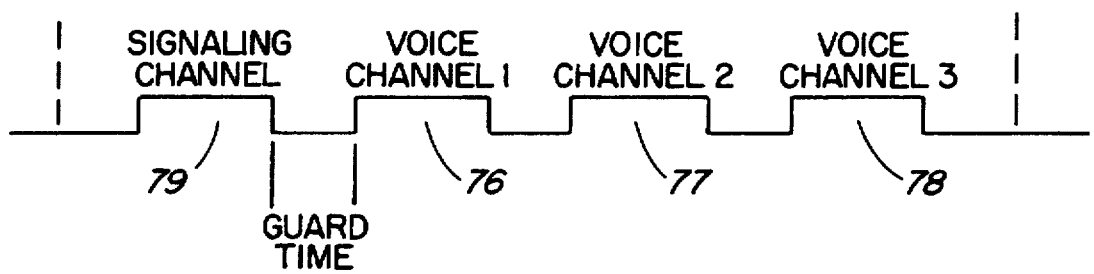

FIGS. 4a and 4b illustrate a single TDM frame 75 of 1 ms duration that includes three voice channels defined by their respective positions in time slots 76, 77, 78 together with a signaling channel shown in a time slot 79. Following a synchronizing byte 81, a guard time of 65 microseconds is provided before the time slot 79. The same guard time is provided before each of the time slots 76-78.

Figure 4C:
FIG. 4c illustrates the contents of a signaling channel in the transmission frame of FIGS. 4a and 4b.
Figure 4D:
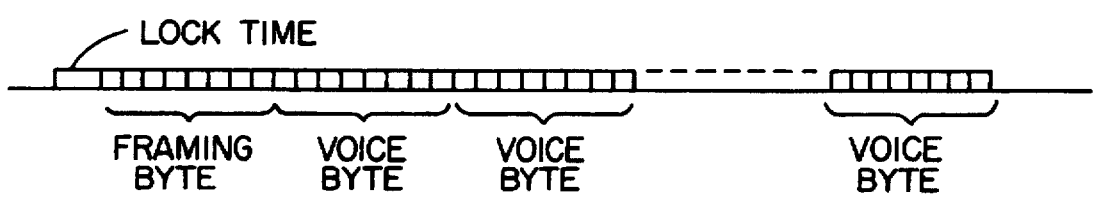
FIG. 4d illustrates the contents of a voice channel in the transmission frame of FIGS. 4a and 4b.

The signaling channel in time slot 79 comprises one byte of data and one byte for framing (FIG. 4c) which results in a signaling rate of 8 Kbps. Each voice channel has one byte for framing and eight bytes for voice (FIG. 4d). This is the data rate for a 64 Kbps simplex channel. Using a frame rate of 1 ms means that a 64 bit transmit buffer and a 64 bit receive buffer are required for transmitting and receiving voice data. The bit rate can be reduced by increasing the frame rate, but would require larger buffers.

When the system 10 is idle, the stations 14 must determine which one will send out the system clock pulse to which the remaining slaves will be synchronized. Any one of the stations 14 may attempt to synchronize to the system and, if it cannot, then the station concludes that there are no stations transmitting. The station thus acquires access to a channel by sending out data with no clock signaling using collision detect, such as token passing, to arbitrate seizure of the line. Once the station has acquired the channel, it will become the master thereof and send out data with the system clock. At this point, data will be sent only during the time slot 79 for the signaling channel. Access to this channel is also determined by the aforenoted method of collision detect.

Figure 5:
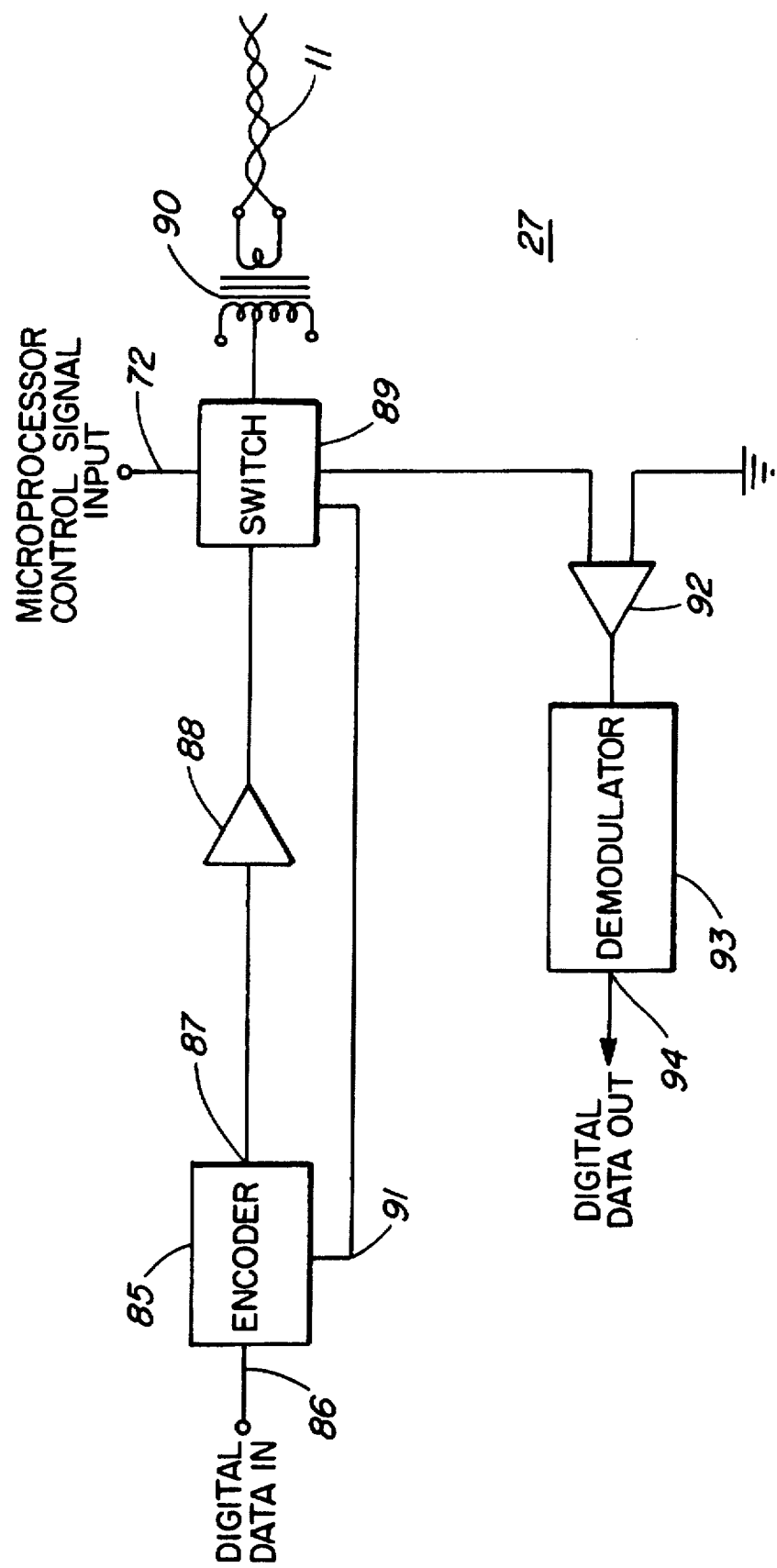
FIG. 5 is a block diagram of a modem used in each telephone station in the system of FIG. 1.

FIG. 5 is a block diagram illustrating a data over voice FSK encoder 85 that forms part of the modem 27 in each station 14. The encoder 85 is an XR215 phase-locked-loop chip in which a voltage controlled oscillator, not shown, is used to convert a bit stream of digital data, applied to an input terminal 86, into binary FSK signals. The FSK signals are output at a terminal 87 from which they are coupled to an operational driver amplifier 88. The output of the amplifier 88 is connected by a switch 89 to a line transformer 90 which couples the signals to the telephone line 11. The switch 89 is also connected to a control terminal 91 of the encoder 85 to turn the FSK transmitting signal on and off in response to a microprocessor control signal on the control line 72.

It will be understood that the switch 89 also functions as a directional control for outgoing and incoming FSK signals. Thus when the encoder 85 is transmitting, FSK signals to a receiver amplifier 92 are blocked. Conversely, when the encoder 85 is turned off, the transformer 90 couples received FSK signals from the line 11 through the switch 89 to the receive amplifier 92 that amplifies and converts the differential FSK signals into common mode signals referenced to the circuit ground. The converted FSK signals are then coupled to a second phase-locked-loop which is configured as an FSK demodulator 93. The demodulator 93 converts the received FSK signals into digital data which is output at a terminal 94 leading to the voice path shown in FIGS. 2 and 3.

The aforedescribed circuit has been demonstrated to operate at carrier frequencies ranging from 5 to 10 MHz, and data rates above 500 Kbps. Combined with speech digitizing circuitry in the station 14 and transmission protocol software described herein, a full-duplex intercom session was demonstrated in which packets of digitized speech were transmitted at 320 Kbps on a 5.8 MHz carrier signal over 400 feet of a twisted pair telephone line while an analog voiceband call was in progress on the same line.

The UART 31 performs serial asynchronous voice and data transfers as well as communications protocol control involving time division multiplexing (time slotting) of up to four speech channels plus one data channel. As shown in FIGS. 2 and 6, the UART 31 communicates with the microprocessor 26 over the eight bit data bus 30 and with the DSP 51 through a synchronous serial interface 62.

Signaling data is transmitted in the time slot 79 which is the first time slot of the frame 75. A synchronization circuit 96 keeps track of incoming packets so that data packets are received at a receiver 97 and are always routed to a receive data register 98. Voice packets, on the other hand, are always routed from the receiver 97 to a receive voice buffer 99 and therefrom to the DSP 51. It will be understood that voice packets may occupy any one of the channels in time slots 76-78. However, it is important to note that both data and voice packets are indistinguishable except for their relative positions within the frame 75.

The synchronization circuit 96 maintains a master clock 100 which defines the position of voice and data packets in the frame 75. Thus, when an intercom session begins, the receiver 97 acquires the first valid packet header and start bit and issues a synchronizing pulse to the circuit 96. In response, the circuit 96 adjusts the clock 100 to conform to the timing of the new session. This is necessary because the session can be initiated by any station 14 in the system 10, and the first station to start a new session forces all other stations to conform to its own master time clock.

A first packet after an inactive interval is always assumed to be data. An inactive interval is defined as one or more frames 75 which do not contain valid packet headers or a frame having zero channels or time slots. All subsequent valid packet headers will cause the receiver 97 to issue a synchronizing pulse to adjust the clock 100 between one and five times per frame, depending upon the time slot utilization. For example, if there are three time slots in use, the clock 100 at each station 14 will be synchronized three times during every frame 75.

The circuit 96 also uses the clock 100 to determine when to issue transmit enable pulses to a transmitter 101. When the data transmit mode is enabled, the transmitter will "packetize" the data by preceding it with a header, framing the data bits with start and stop bits, and will then transmit the packet only when the circuit 96 issues the transmit enable pulse defining the data time slot. When one of the voice channels is enabled, the transmitter 101 will similarly packetize the bytes of data which have accumulated in a transmit voice buffer 102 and a transmit data register 103. Transmission of the voice packet occurs only when the circuit 96 issues the transmit enable pulse defining the correct voice time slot. A command status register 104, data registers 98, 103 and voice buffer 102 define the content of the packets and consequent data transmission. On the other hand, the circuit 96 determines when the data will be transmitted by the position of the packets within the frame 75.

At any station 14, digitized voice is transferred synchronously between the DSP 51 and UART 31 at 64 Kbps, while the UART transmits and receives data asynchronously at 640 Kbps to and from other stations 14 in the system 10. It will be understood that there is no predetermined correlation between the clock 59 of the microprocessor 26 which drives the synchronous transfer of voice bytes between the DSP 51 and UART 31 and the inter-station frame synchronization established by the clock 100 since any station 14 can become a session master. As previously described, the station 14 which initiates a session forces all other stations in the system 10 to conform to its unique frame synchronization. For this reason the digitized voice bytes are buffered in each direction for transmit and receive. It is important to note that inter-station communication takes place in a manner which is synchronized at the frame level but which is asynchronous at the packet level. This means that when a new communication session is established, the data channel time slot 79 may be disabled as soon as at least one of the other voice channel time slots 76-78 is enabled to maintain synchronization.

To those skilled in the art to whom this specification is addressed, it will be apparent that the embodiments aforedescribed may be varied to meet particular specialized requirements without departing from the true spirit and scope of the invention disclosed. The foregoing embodiments are therefore not to be taken as indicative of the limits of the invention but rather as exemplary structures thereof which are described by the claims appended hereto.

APPENDIX

TIMING AND DECISION MAKING SOURCE CODE

------------------------------------- Master Code -------------------------------------

```
;***********************************************************************
;*
;*      S1RXINT:    serial port 1 receive interrupt
;*
;*      INPUT:      nothing
;*
;*      RETURNS:    datum just received stored in BUFFER_REGISTER
;*
;*      CHANGES:    A (acc), X, Y
;*
;*      NOTE:
;***********************************************************************
.PUB S1RXINT
S1RXINT:;
        PHA                              ; save register -- 3c
        TXA                              ; -- 2c
        PHA                              ; -- 3c
        DEC RX_COUNT                     ; -- 6c
        BEQ LAST_BYTE                    ; -- 2c_nb/4c_b
        LDX BR_HEAD                      ; -- 4c
        LDA SIO1RXB                      ; grab byte just received -- 3c
        STA BUFFER_REGISTER,X            ; -- 5c
        INC BR_HEAD                      ; -- 6c
        PLA                              ; -- 4c
        TAX                              ; -- 2c
        PLA                              ; -- 4c
        RTI                              ; -- 6c      --> -- 57 cycles -- 22.23us
LAST_BYTE:
        CLB SIO1RXEN, SIO1CNTL           ; disable serial 1 RX -- 5c
        CLB LED1,PORT5                   ; -- 5c
        CLB IAR, PORT5                   ; seize FSK generator -- 5c
        LDX BR_HEAD                      ; -- 4c
        LDA SIO1RXB                      ; grab byte just received -- 3c
        STA BUFFER_REGISTER,X            ; -- 5c
        INC BR_HEAD                      ; -- 6c
        LDA #8                           ; -- 2c
        STA RX_COUNT                     ; -- 5c
        SEB RX_PACKET,SERIAL_FLAGS       ; INDICATE THAT A PACKET HAS BEEN RECEIVED
        PLA                              ; -- 4c
```

APPENDIX-continued

TIMING AND DECISION MAKING SOURCE CODE

```
        TAX                             ; - 2c
        PLA                             ; - 4c
        RTI                             ; - 6c -----> 80 cycles -- 31.2us
;******************************************************************
;*
;* MODULE: INT_0 interrupt service routine - by A1
;*         used for intercom demo
;*    NOTE:
;* INPUT PARAMETERS: None
;*
;* OUTPUT PARAMETERS: None
;*
;* REGISTERS AFFECTED: None
;*
;******************************************************************
.PUB INT_0
INT_0:
        CLI                             ; - 2c
        PHA                             ; save registers -- 3c
        TXA                             ; - 2c
        PHA                             ; - 3c
        LDX BR_TAIL                     ; - 4c
        LDA BUFFER_REGISTER,X           ; - 5c
        STA DATABUS                     ; store the byte in port2 -- 5c
        CLB SHIFT_REG,CTLBUS3           ; Latch the voice data into the ASIC -- 5c
        SEB SHIFT_REG,CTLBUS3           ; . . . - 5c
        INC BR_TAIL                     ; - 2c
;---------------------------------------------------------------
        LDA PORT8                       ; - 4c
        LDX BR2_HEAD                    ; - 4c
        STA BUFFER_REGISTER2,X          ; - 5c
        INC BR2_HEAD                    ; - 2c
        DEC BR2_COUNT                   ; - 6c      -----> 30c to here
        BNE INT_0_EXIT                  ; - 2c_nb/4c_b
        BBS RX_PACKET,SERIAL_FLAGS,OK_TO_START
        SEB RX_PACKET,SERIAL_FLAGS
        LDM #8,BR2_COUNT
        CLB SIO1RXEN, SIO1CNTL          ; disable serial 1 RX -- 5c
        CLB LED1,PORT5                  ; - 5c
        CLB IAR,PORT5
        BRA INT_0_EXIT
OK_TO_START:
        LDM #8,BR2_COUNT
        LDM #8,TX_COUNT
        LDX BR2_TAIL                    ; - 4c
        LDA BUFFER_REGISTER2,X          ; - 5c
        STA SIO1TXB                     ; - 5c
        INC BR2_TAIL                    ; - 2c
        LDM #$F5,SIO1TXB
INT_0_EXIT:
        PLA                             ; restore register - 4c
        TAX                             ; - 2c
        PLA                             ; - 4c
        RTI                             ; return -- 6c ----> short=50c=19.50us
                                                     ---->long =98c=38.22us /
;******************************************************************
;
; TXINT         —   TX INTERRUPT ROUTINE
;
; CALL WITH:
;
;   RETURNS:       nothing
;
;   CHANGES:       A REGISTER (accumulator), X
;
;******************************************************************
.PUB    TXINT
TXINT:
        DEC TX_COUNT                    ; - 6c
        BEQ SET_TIMER                   ; - 2c_nb/4c_b
        PHA                             ; - 3c
        TXA                             ; - 2c
        PHA                             ; - 3c
        LDX BR2_TAIL                    ; - 4c
        LDA BUFFER_REGISTER2,X          ; - 5c
        STA SIO1TXB                     ; - 5c
        INC BR2_TAIL                    ; - 2c
```

APPENDIX-continued

TIMING AND DECISION MAKING SOURCE CODE

```
            PLA                                  ; - 4c
            TAX                                  ; - 2c
            PLA                                  ; - 4c
            RTI                                  ; - 6c
SET_TIMER:
            LDM #22,TIMX                         ; wait 68.75us before enabling RX - 4c
            LDM #00,PRESCX                       ; - 4c
            CLB 4,0IRR1                          ; - 5c
            SEB 4,IRC1                           ; - 5c
            CLB 3,TIMXY                          ; - 5c
            LDM #6,TIMY                          ; TURN OFF FSK GENERATOR IN 25us
            LDM #00,PRESCY
            CLB 5,IRR1
            SEB 5,IRC1
            CLB 7,TIMXY
            CLB RX_PACKET,SERIAL_FLAGS           ; INDICATE THAT NO PACKET RAS BEEN RECEIVED
            RTI
;****************************************************************
;*
;*      TIMERXINT:
;*
;*      INPUT:   nothing
;*
;*      RETURNS:
;*
;*      CHANGES:
;*
;*      NOTE:
;****************************************************************
.PUB TIMERXINT
TIMERXINT:
            SEB 3,TIMXY                          ; stopt the timer --
            CLB INT_1_BIT, IRR1                  ; clear INT_1 interrupt request bit
            SEB INT_1_BIT, *IRC1                 ; enable INT_1 -- external receive uart -- 5c
            SEB LED1,PORT5                       ; - 5c
            SEB IAR ,PORT5                       ; release FSK generator
            RTI                                  ; - 6c
;****************************************************************
;*
;*      TIMERYINT:
;*
;*      INPUT:   nothing
;*
;*      RETURNS:
;*
;*      CHANGES:
;*
;*      NOTE:
;****************************************************************
.PUB TIMERYINT
TIMERYINT:
            BBS TURN_OFF,SERIAL_FLAGS,TURN_OFF_FSK
            DEC TIM1_COUNT
            BNE TIMERY_EXIT
            SEB 7, TIMXY                         ; disable the timer
            SEB TURN_OFF,SERIAL_FLAGS
            CLB 0, IRR1                          ; clear pending INT0 interrupts
            SEB 0, IRC1                          ; enable INT0 -- MASTER
TIMERY_EXIT:
            RTI
TURN_OFF_FSK:
            SEB 7, TIMXY                         ; disable the timer
            SEB IAR, PORT5                       ; release FSK generator
            RTI
;------------------------ Master support code ------------------------
            SEI
.PUB        CRAPLABEL
CRAPLABEL:
            LDM #INPUT, PORT8DIR                 ; set port8 to input
            LDM #INPUT, PORT0DIR                 ; set port0 to input
            CLB 2,PORT4DIR                       ; set pin 2 of port4 to an input
            CLB 3,PORT4DIR                       ; set pin 3 of port4 to an input
            SEB 6,PORT4DIR                       ; set pin 6 of port4 to an output
            CLB CLEAR_UART,PORT4
            LDA #0
            STA IRC1                             ; mask out all interrupts
            STA IRC2                             ; . . .
```

APPENDIX-continued

TIMING AND DECISION MAKING SOURCE CODE

```
            CLB IAR,PORT5               ; seize the FSK generator
            LDA #$88                    ; setup & inhibit timers X & Y
            STA TIMXY
            CLB 0, $3C                  ; clear pending INT0 interrupts
            SEB 0, $3A                  ; select rising edge triggered
            CLB 0, IRC1                 ; DISable INT0 -- *** MASTER
            CLB 4, IRR1                 ; clear pending TIMERX interrupt
            SEB 4, IRC1                 ; enable TIMERX interrupt
            SEB 3,TIMXY                 ; disable TIMERX
            JSR INITTRX                 ; INITIALIZE TX-RX-SIO1 - TEMP
            LDM #8,BR2_COUNT            ; initialize BR2_COUNT to 8
            CLB TURN_OFF,SERIAL_FLAGS
            SEB RX_PACKET,SERIAL_FLAGS  ; INDICATE THAT A PACKET HAS BEEN RECEIVED
            LDA #25                     ; 5 second startup delay
            STA TIM1_COUNT
            LDM #$FF,TIMY
            LDM #$FF,PRESCY
            CLB 5,IRR1
            SEB 5,IRC1
            CLB 7,TIMXY
;***********************************************************************
;           --- *** END INTERCOM_DEMO STUFF *** ---
;***********************************************************************
            CLI
--------------------------------Slave Code-----------------------------------
;***********************************************************************
;*
;*      S1RXINT:    serial port 1 receive interrupt -- SLAVE PACKET SEND
;*
;*      INPUT:      nothing
;*
;*      RETURNS:    datum just received stored in SIO1BUF
;*
;*      CHANGES:    A (acc), X, Y
;*
;*      NOTE:
;***********************************************************************
.PUB S1RXINT
S1RXINT:;
            PHA                         ; save register -- 3c
            TXA                         ; save X
            PHA
            DEC RX_COUNT
            BEQ LAST_BYTE
            LDX BR_HEAD                 ; point to next storage location
            LDA SIO1RXB                 ; grab byte just received -- 3c
            STA BUFFER_REGISTER,X       ; -- 5c store the byte
            INC BR_HEAD
            PLA                         ; restore X
            TAX
            PLA                         ; -- 4c restore Acc
            RTI                         ; -- 6c
.PUB LAST_BYTE
LAST_BYTE:
            CLB SIO1RXEN, SIO1CNTL      ; disable serial 1 RX -- 5c
            CLB LED1,PORT5              ; -- 5c
            CLB IAR, PORT5              ; seize FSK generator
            LDX BR_HEAD                 ; point to next storage location
            LDA SIO1RXB                 ; grab byte just received -- 3c
            STA BUFFER_REGISTER,X       ; -- 5c store the byte
            INC BR_HEAD
            LDA #8
            STA RX_COUNT
            STA TX_COUNT
            CLB GOT_START,SERIAL_FLAGS
            LDM #30, PRESCX             ; set TimerX to begin TX'ing in 93.75us
            LDM #00, TIMX               ;
            CLB 4,IRR1                  ; clear pending interrupts
            SEB 4,IRC1                  ; enable TimerX interrupt
            CLB 3,TIMXY                 ; start TimerX
            PLA                         ; restore X
            TAX
            PLA
            RTI
;***********************************************************************
;*
;* MODULE: INT_0 interrupt service routine - by A1 - SLAVE PACKET SEND
```

APPENDIX-continued

TIMING AND DECISION MAKING SOURCE CODE

```
;*           used for intercom demo
;*      NOTE:
;* INPUT PARAMETERS: None
;*
;* OUTPUT PARAMETERS: None
;*
;* REGISTERS AFFECTED: None
;*
;********************************************************************
.PUB INT_0
INT_0:
        CLI                             ; allow other interrupts to barge in
        PHA                             ; save register -- 3c
        TXA                             ; -- 2c
        PHA                             ; -- 3c
        LDX BR_TAIL                     ; -- 4c
        LDA BUFFER_REGISTER,X           ; -- 5c
        STA DATABUS                     ; store the byte in port2 -- 5c
        CLB SHIFT_REG,CTLBUS3           ; Latch the voice data into the ASIC -- 5c
        SEB SHIFT_REG,CTLBUS3           ; . . . -- 5c
        INC BR_TAIL                     ; -- 2c
;--------------------------------------------------------------------
        LDA PORT8                       ; -- 4c
        LDX BR2_HEAD                    ; -- 4c
        STA BUFFER_REGISTER2,X          ; -- 5c
        INC BR2_HEAD                    ; -- 5c
        DEC RX_COUNT            ;****
        BEQ SEND_BYTE           ;****
        PLA                             ; restore register -- 4c
        TAX                             ; -- 2c
        PLA                             ; -- 2c
        RTI                             ; return -- 6c --> 83c to get here(including R
                                        ; . . . 32.37us
SEND_BYTE:                      ;****
        LDA #8                  ;****
        STA RX_COUNT            ;****
        STA TX_COUNT            ;****
        LDM #$24,SIO1TXB        ;****
        PLA                     ;****   ; restore register -- 4c
        TAX                     ;*****  ; -- 2c
        PLA                     ;****   ; -- 4c
        RTI                     ;****   ; return -- 6c --> 83c to get here(includ
;********************************************************************
;
; TXINT    -   TX INTERRUPT ROUTINE       - SLAVE
;
;
; CALL WITH:
;
; RETURNS:      nothing
;
; CHANGES:      A REGISTER (accumulator), X
;
;********************************************************************
.PUB    TXINT
TXINT:
        DEC TX_COUNT
        BEQ TX_EXIT
        PHA
        TXA
        PHA
        LDX BR2_TAIL
        LDA BUFFER_REGISTER2,X
        STA SIO1TXB
        INC BR2_TAIL                    ; -- 5c  |
        PLA                             ; -- 4c  |
        TAX                             ; -- 2c  |
        PLA                             ; -- 4c  |
        RTI                             ; -- 6c  | ----> 10.5us
TX_EXIT:
        LDM #24,PRESCY                  ; set TimerY to begin listening in 75us
        LDM #00,TIMY                    ;
        CLB 5,IRR1                      ; clear pending TimerY interrupts
        SEB 5, IRC1                     ; enable TimerY interrupts
        CLB 7,TIMXY                     ; start TimerY
        NOP
        NOP
```

APPENDIX-continued

TIMING AND DECISION MAKING SOURCE CODE

```
              NOP
              NOP
              NOP
TX_WAIT:
              BBC 2, $19, TX_WAIT              ; wait for shift to complete
              SEB IAR,PORT5                    ; turn off FSK generator
              RTI                              ; -- 6c
;*********************************************************************
;
;   TIMERYINT:    -   Int. routine to service the rxint timeout
;
; CALL WITH:         nothing
;
;   RETURNS:         nothing
;
;   CHANGES:         Acc, X, Y
;
;*********************************************************************
.PUB     TIMERYINT
TIMERYINT:
SEB 7,TIMXY                                    ; stop TimerY
CLB 2,IRR1                                     ; clear pending RX interrupts
SEB SIO1RXEN, SIO1CNTL                         ; enable serial 1 RX -- 5c
SEB LED1,PORT5                                 ; -- 5c
RTI
;*********************************************************************
;*
;*   TIMERXINT  begins the slave serial transmission
;*
;*   INPUT:       nothing
;*
;*   RETURNS:
;*
;*   CHANGES:
;*
;*   NOTE:
;*********************************************************************
.PUB TIMERXINT
TIMERXINT:
              SEB 3,TIMXY                      ; stop the timer -- 5c
              PHA                              ; -- 3c
              TXA                              ; -- 2c
              PHA                              ; -- 3c
              LDX BR2_TAIL                     ; -- 4c
              LDA BUFFER_REGISTER2,X           ; -- 5c get next byte
              STA SIO1TXB                      ; -- 4c send next byte
              INC BR2_TAIL                     ; -- 4c point to next byte to send
              PLA                              ; -- 4c
              TAX                              ; -- 2c
              PLA                              ; -- 4c
              RTI                              ; -- 6c
;*********************************************************************
;
;   TIMERYINT:    -   Int. routine to service the rxint timeout
;
; CALL WITH:         nothing
;
;   RETURNS:         nothing
;
;   CHANGES:         Acc, X, Y
;
;*********************************************************************
.PUB     TIMERYINT
TIMERYINT:
              SEB 7,TIMXY                      ; stop TImerY
              CLB 2,IRR1                       ; clear pending RX interrupts
              SEB SIO1RXEN, SIO1CNTL           ; enable serial 1 RX -- 5c
              SEB LED1,PORT5                   ; -- 5c
              RTI
---------------------- Slave support code ----------------------
              SEI
.PUB     CRAPLABEL
CRAPLABEL:
              LDM #INPUT, PORT8DIR             ; set port8 to input
              CLB 2,PORT4DIR                   ; set pin 2 of port4 to an input
              LDA #0
              STA IRC1                         ; disable all interrupts
```

APPENDIX-continued

TIMING AND DECISION MAKING SOURCE CODE

```
STA IRC2                    ; ...
SEB IAR,PORT5               ; release FSK generator - SLAVE
LDA #$88                    ; setup & inhibit timers X & Y
STA TIMXY
CLB 0, $3C                  ; clear pending INT0 interrupts
SEB 0, $3A                  ; select rising edge triggered
SEB 0, IRC1                 ; enable INT0 - SLAVE
CLB 4, IRR1                 ; clear pending TIMERX interrupt
SEB 4, IRC1                 ; enable TIMERX interrupt
SEB 3,TIMXY                 ; disable TIMERX
JSR INITTRX                 ; INITIALIZE TX-RX-SIO1 - TEMP
LDM #8,RX_COUNT             ; Initialize RX_COUNT
```

The embodiments of the invention in which an exclusive property or privilege is claimed are defined as follows:

1. In a telecommunications system having a plurality of subscriber stations interconnected along a communications path, apparatus disposed at individual ones of the stations for transceiving an input digital bit stream converted into corresponding binary FSK radio frequency output signals, comprising in combination:

an FSK encoder having a control terminal, a first input terminal to which a source of digital data is connected and a first output terminal connectable to the path for communicating encoder generated binary FSK radio frequency output signals to a remote station on the path;

an FSK demodulator having a second input terminal to which received FSK signals are selectively coupled from the path and a second output terminal at which demodulated signals comprise a bit stream of digital data;

a directional switch connected to the control terminal for selectively enabling and disabling the encoder and switching a connection to the path from respective ones of the first output terminal and the second input terminal in response to control signals input to the switch;

means for resolving contention between call initiating stations and identifying a station seizing the path as a master station; and control means connected to the switch for enabling a switched connection from the first output terminal to the path and enabling the encoder of the master station with a start-up time delay prior to transferring digital data thereto.

2. Apparatus as claimed in claim 1, wherein the control means includes means for identifying the contentious station not seizing the path as a slave station, and in response thereto initially disabling the encoder thereof and switching the path connection from the first output terminal to the second input terminal of the slave station for initiating data reception.

3. Apparatus as claimed in claim 2, wherein the control means further includes means for disabling the encoder of the master station at the end of data transmission, disconnecting the first output terminal thereof from the path and connecting the path to the second input terminal of the master station with a first predetermined time delay sufficient for the slave station to engage the path for a response, thereby maintaining the path in a seized state and retaining a low noise level thereon when monitoring a reply at the master station.

4. Apparatus as claimed in claim 3, wherein the control means further includes means for disabling the encoder of the slave station at the end of data transmission, disconnecting the first output terminal thereof from the path and connecting the path to the second input terminal of the slave station with a second predetermined time delay sufficient for the master station to engage the path for a response, thereby maintaining the path in a seized state and retaining a low noise level thereon when monitoring a reply at the slave station.

5. Apparatus as claimed in claim 4, wherein the control means further includes timing means for disabling the encoder and demodulator of the master station after the last bit of digital data has been shifted out of the encoder and transmitted, the encoder of the master station being disabled following a third predetermined delay to maintain integrity of the path while the slave station processes the last byte received.

6. Apparatus as claimed in claim 5, further comprising buffer means disposed in a signal path intermediate the source of digital data and the first input terminal for temporarily storing digital data destined thereto.

7. Apparatus as claimed in claim 6, further comprising driver amplifier means connected intermediate the first output terminal and a signal input of the switch for boosting the FSK signal to a predetermined level.

8. Apparatus as claimed in claim 7, further comprising second amplifier means connected intermediate the switch and the second input terminal for converting a received differential FSK radio frequency signal into a common mode FSK radio frequency signal.

9. Apparatus as claimed in claim 8, wherein the encoder is adapted to operate at a carrier frequency in the range of from 5 to 10 MHz and the bit stream of digital data has a maximum bit rate of at least 500 Xbps.

10. Apparatus as claimed in claim 9, wherein the control means comprises a microprocessor having memory means storing timing and decision making operating codes for selectively enabling the apparatus of a station in one of, a master and slave mode of operation.

11. Apparatus as claimed in claim 10, wherein the communications path comprises a telephone line.

12. Apparatus as claimed in claim 11, further comprising a transformer for coupling the line to individual ones of the first output terminal and the second input terminal through respective switched connections.

13. Apparatus as claimed in claim 12, wherein the start-up time delay is at least 10 microseconds.

14. Apparatus as claimed in claim 13, wherein the first predetermined time delay is substantially 68.25 microseconds.

15. Apparatus as claimed in claim 14, wherein the second predetermined time delay is substantially 75 microseconds.

16. Apparatus as claimed in claim 15, wherein the third predetermined time delay is substantially 25 microseconds.

* * * * *

UNITED STATES PATENT AND TRADEMARK OFFICE
CERTIFICATE OF CORRECTION

PATENT NO. : 5,787,115
DATED : July 28, 1998
INVENTOR(S) : Robert Turnbull; David Westergaard; Bruce W. Yee; Michael J. Lucas; Alan D. Eyre; Brian McKinney It is certified that error appears in the above-indentified patent and that said Letters Patent is hereby corrected as shown below:

Col. 22, line 46, delete "Xbps" and insert -- Kbps --.

Signed and Sealed this

Sixteenth Day of November, 1999

*Attest:*

Q. TODD DICKINSON

*Attesting Officer*     Acting Commissioner of Patents and Trademarks